United States Patent [19]

Rauscher

[11] Patent Number: 5,838,675
[45] Date of Patent: Nov. 17, 1998

[54] CHANNELIZED RECEIVER-FRONT-END PROTECTION CIRCUIT WHICH DEMULTIPLEXES BROADBAND SIGNALS INTO A PLURALITY OF DIFFERENT MICROWAVE SIGNALS IN RESPECTIVE CONTIGUOUS FREQUENCY CHANNELS, PHASE ADJUSTS AND MULTIPLEXES CHANNELS

[75] Inventor: Christen Rauscher, Alexandria, Va.

[73] Assignee: The United States of America as represented by the Secretary of the Navy, Washington, D.C.

[21] Appl. No.: 674,951

[22] Filed: Jul. 3, 1996

[51] Int. Cl.$^6$ ............................ H04J 1/00; H04J 1/02; H04J 3/04; H04B 1/10
[52] U.S. Cl. ................... 370/343; 370/497; 370/480; 370/536; 455/303; 455/304
[58] Field of Search .................... 370/497, 343, 370/480–496, 535–537, 542, 916; 455/217, 296, 303–308

[56] References Cited

U.S. PATENT DOCUMENTS

| | | | |
|---|---|---|---|
| 4,002,980 | 1/1977 | Herz | 370/497 |
| 4,258,435 | 3/1981 | Levy | 370/497 |
| 4,484,155 | 11/1984 | Nowogrodzki | 331/49 |
| 4,736,171 | 4/1988 | Minarik | 333/24 R |
| 5,101,181 | 3/1992 | Rauscher | 370/497 |
| 5,233,609 | 8/1993 | Hunton | 370/123 |
| 5,268,905 | 12/1993 | Soloff | 370/497 |
| 5,438,572 | 8/1995 | Rauscher | 370/497 |
| 5,625,871 | 4/1997 | Myer | 370/343 |

Primary Examiner—Douglas W. Olms
Assistant Examiner—David R Vincent
Attorney, Agent, or Firm—Thomas E. McDonnell; George Jameson

[57] ABSTRACT

A channelized protection circuit for protecting the front-end of a receiver from the detrimental effects of interference signals within the bandwidth of received signals is disclosed. The channelized protection circuit comprises: a frequency demultiplexer for separating a broadband input signal into a plurality of different signal components in respective contiguous frequency channels; a plurality of signal conditioning sub-circuits respectively responsive to the plurality of different signal components for selectively performing a conditioning operation on the plurality of different signal components to produce a plurality of conditioned signal components minimally affected by interference signals from within any of the contiguous frequency channels; and a frequency multiplexer having a plurality of contiguous frequency channels for recombining the plurality of conditioned signal components into a composite conditioned signal of original bandwidth and at a safe power level with a minimum amount of interference. Preferably, the channelized protection circuit also includes a first plurality of phase-adjusting circuits for compensating for phase imbalances among the plurality of different signal components, and also includes a second plurality of phase-adjusting circuits for compensating for phase imbalances among the plurality of conditioned signal components.

24 Claims, 4 Drawing Sheets

CHANNELIZED RECEIVER-FRONT-END PROTECTION CIRCUIT WHICH DEMULTIPLEXES BROADBAND SIGNALS INTO A PLURALITY OF DIFFERENT MICROWAVE SIGNALS IN RESPECTIVE CONTIGUOUS FREQUENCY CHANNELS, PHASE ADJUSTS AND MULTIPLEXES CHANNELS

BACKGROUND OF THE INVENTION

1. Field of the Invention

The present invention relates to receiver protection circuits and more particularly to a channelized receiver-front-end protection circuit which provides front-end protection for a wideband receiver against detrimental, and possibly castrophic, effects of interference signals.

2. Description of Related Art

One of the critical issues in the design of modern high-frequency receivers with wide instantaneous bandwidths is the task of adequately protecting front-end circuitry against adverse effects of large interference signals. Such effects can range from reduced receiver sensitivity and confused signal identification processes to burn-out of vital circuit components. Unfortunately, there is no all-purpose remedy. Among the simplest protective measures is the use of shunt-connected p-i-n diodes that progressively attenuate incident signals when power levels exceed a predetermined threshold. The diodes respond to aggregate signal amplitudes, however, and consequently don't possess the ability to differentiate between wanted and unwanted signals on the basis of frequency. In addition, diode nonlinear characteristics may introduce bothersome signal harmonics and intermodulation products.

A recognized alternative is to selectively suppress offending incident signals with the help of frequency-tunable or switched notch filters, restricting receiver performance degradation to narrow frequency intervals, with minimum sacrifice of operational bandwidth. Unlike p-i-n diode configurations that can operate autonomously, notch-filter-based solutions require provisions for identifying and tracking random interference signals. This can present a challenge if high-Q notch characteristics are to be reliably maintained over temperature and time. Difficulties are compounded if there are multiple random signals involved that need to be identified individually and tracked with separate frequency-tunable notches. Pertinent design concerns include the complexity of resultant circuit implementations, the stability and speed of employed control mechanisms, and the effects of dissipation introduced by the tuning processes.

Additional limiter options encompass ferrite-based approaches and techniques that utilize gas discharge phenomena. Ferrite limiters operate by dissipating excess signal power through the excitation of magnetic spin waves, a material-intrinsic process which provides frequency-selective amplitude limiting. The technique, nevertheless, is not without practicability concerns of its own. They include transient signal leakage, confinement of operations to the low end of the microwave frequency range, and relatively modest values of achievable large-signal amplitude compression per limiter section. Gas discharge devices are primarily used in high-power applications. They are not inherently frequency-selective and are often supplemented by other techniques to enhance transient response characteristics.

SUMMARY OF THE INVENTION

It is therefore an object of the invention to provide a novel receiver-front-end protection circuit.

Another object of the invention is to provide receiver-front-end protection against detrimental, and possibly catastrophic effects of interference signals.

Another object of the invention is to provide a front-end receiver protection circuit which relies on frequency channelization of incident signals to accomplish amplitude limiting on a frequency-selective, self-induced, instantaneous basis.

Another object of the invention is to provide a front-end receiver protection circuit comprising an input frequency demultiplexer which divides an incoming signal into contiguous frequency sub-bands or frequency channels, an array of signal conditioning sub-circuits (such as limiters, amplifiers, limiting amplifiers, switches, or a combination of two or more signal conditioning sub-circuits) that affect the associated frequency channels separately, and an output frequency multiplexer that recombines the amplitude-limited signal components to reestablish a signal of original total bandwidth, but at a safe power level.

A further object of the invention is to provide a front-end receiver protection circuit that performs frequency demultiplexing of an input broadband signal which may contain an interfering signal, power limiting and amplification of demultiplexed signal components to produce conditioned signal components, and frequency multiplexing of the conditioned signal components in a contiguous way that will not allow signal transmission to drop out at frequencies within the original frequency band due to out-of-phase addition and consequent cancellation of signal components.

These and other objects of this invention are achieved by providing a channelized protection circuit for protecting the front-end of a receiver from the detrimental effects of interference signals within the bandwidth of received signals. The channelized protection circuit basically comprises an input frequency demultiplexer which separates a composite input signal within a preselected bandwidth into contiguous frequency sub-bands, an array of signal conditioning sub-circuits that selectively affect the frequency sub-bands to produce a plurality of conditioned signal components, each of which is not detrimently affected by disturbances from signal components from other contiguous frequency channels, and an output frequency multiplexer that recombines the conditioned signals in the frequency sub-bands into a composite signal of the original preselected bandwidth and at a safe power level with a minimum amount of interference.

BRIEF DESCRIPTION OF THE DRAWINGS

These and other objects, features and advantages of the invention, as well as the invention itself, will be better understood by reference to the following detailed description of the invention when considered in connection with the accompanying drawings wherein like reference numerals designate identical or corresponding parts throughout the several views and wherein.

DETAILED DESCRIPTION OF THE INVENTION

Before the drawings are discussed, it should be noted that the receiver protection circuit of the invention permits modern wideband receivers to sustain useful operations in the presence of compound interference signals by not only having such interference signals confined in terms of amplitude but also having their spectrally dispersed byproducts confined in terms of frequency. Such operation of the invention will be more fully discussed by now referring to the drawings.

Figure 1:
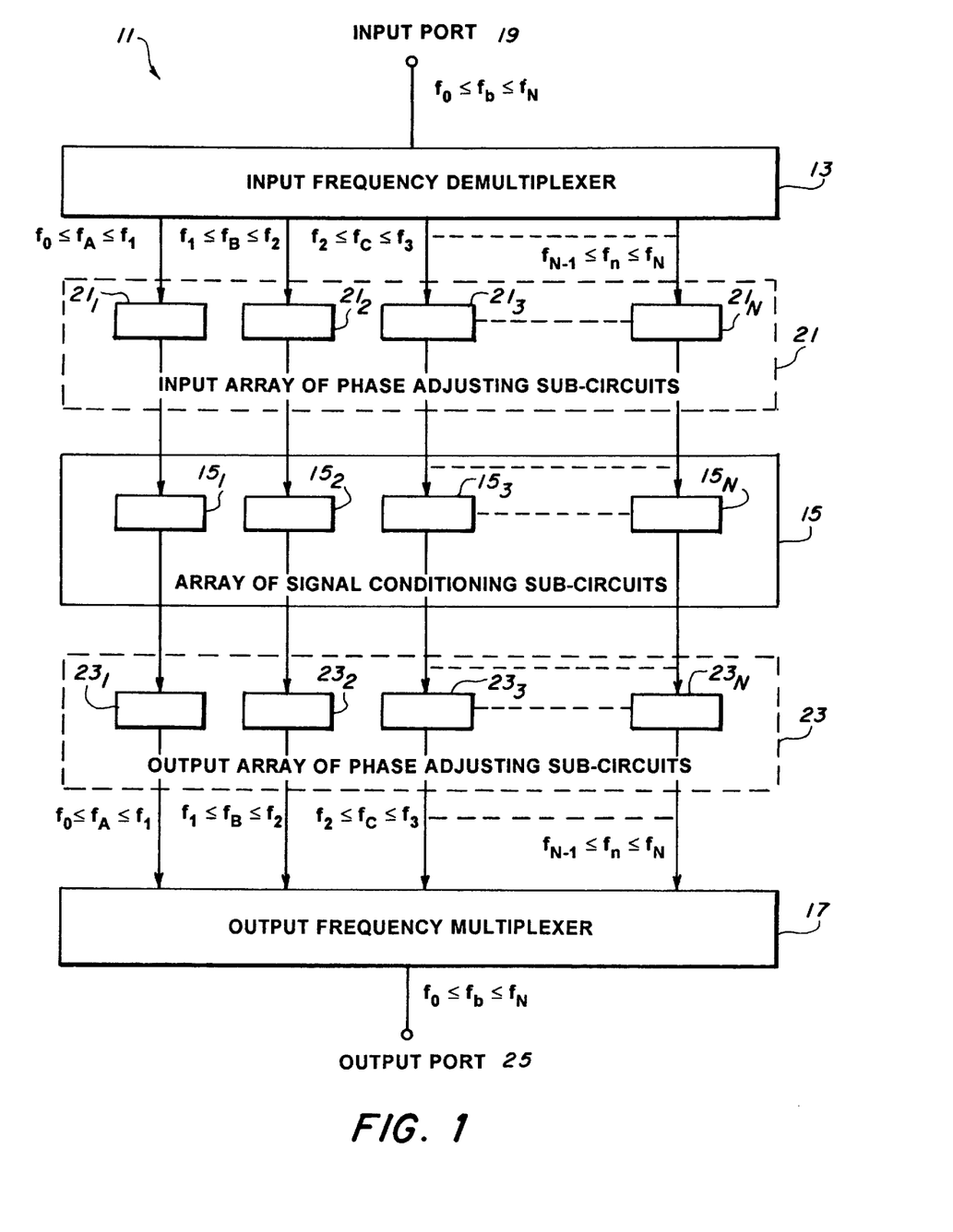
FIG. 1 is a schematic diagram of a channelized receiver protection circuit according to the invention.

Referring now to FIG. 1, a schematic block diagram of a receiver channelized protection circuit 11 of the invention is shown. The protection circuit 11 basically comprises an input frequency demultiplexer 13, an array 15 of signal conditioning sub-circuits $15_1$, $15_2$, $15_3$, . . . $15_N$, and an output frequency multiplexer 17.

The input frequency demultiplexer 13 in the protection circuit 11 is implemented to have a plurality of contiguous channels or subbands, $f_0-f_1$, $f_1-f_2$, $f_2-f_3$, . . . $f_{N-1}-f_N$, within the passband $f_0$ to $f_N$ of the receiver (not shown).

In operation, a broadband input signal $f_s$ (not shown), having an exemplary frequency span or bandwidth $\Delta f_s$, is applied to the input frequency demultiplexer 13 by way of an input port 19 of the protection circuit 11. The demultiplexer 13 divides or separates this broadband input signal $f_s$ of bandwidth $\Delta f_s$ into n different contiguous frequency components $f_A$, $f_B$, $f_C$ . . . $f_n$ that are respectively contained within the contiguous channels or subbands $f_0-f_1$, $f_1-f_2$, $f_2-f_3$, . . . $f_{N-1}-f_N$ of the demultiplexer 13. This operation of separating the input signal $f_s$ into a plurality of contiguous frequency components that are respectively contained within the plurality of contiguous channels in the demultiplexer 13 is represented, as shown in FIG. 1, by the terms $f_0 \leq f_A \leq f_1$, $f_1 \leq f_B \leq f_2$, $f_2 \leq f_C \leq f_3$, . . . $f_{N-1} \leq f_n \leq f_N$ that are shown at output ports (not shown) of the demultiplexer 13. The channelized contiguous frequency components $f_A$, $f_B$, $f_C$ . . . $f_n$ at the output ports of the demultiplexer 13 are then respectively applied by way of input ports (not shown) to the array 15 of signal conditioning sub-circuits $15_1$, $15_2$, $15_3$, . . . $15_N$.

The array 15 of signal conditioning sub-circuits $15_1$, $15_2$, $15_3$, . . . $15_N$ selectively performs some predetermined conditioning operation on the different contiguous frequency components $f_A$, $f_B$, $f_C$ . . . $f_n$ from the demultiplexer 13, such as limiting, amplification, amplitude limiting, switching or combinations thereof, in order to reduce or minimize the amount of disturbance from interference signals that may be present within one or more of the N contiguous frequency channels $f_0-f_1$, $f_1-f_2$, $f_2-f_3$, . . . $f_{N-1}-f_N$. After being conditioned by the array 15, the n different conditioned frequency components $f_A$, $f_B$, $f_C$ . . . $f_n$ are then respectively applied to output ports (not shown) of the array 15.

The output frequency multiplexer 17, like the input frequency demultiplexer 13, is implemented to have a plurality of contiguous channels or subbands, $f_0-f_1$, $f_1-f_2$, $f_2-f_3$, . . . $f_{N-1}-f_N$, within the passband $f_0$ to $f_N$ of the receiver (not shown). The n different conditioned frequency components $f_A$, $f_B$, $f_C$ . . . $f_n$ that are respectively contained within the contiguous channels or subbands $f_0-f_1$, $f_1-f_2$, $f_2-f_3$, . . . $f_{N-1}-f_N$ of the array 15 are then applied from the output ports in the array 15 to input ports (not shown) of the multiplexer 17. The channelized plurality of conditioned frequency components $f_A$, $f_B$, $f_C$ . . . $f_n$ that are respectively contained within the plurality of contiguous channels in the array 15 are represented, as shown in FIG. 1, by the terms $f_0 \leq f_A \leq f_1$, $f_1 \leq f_B \leq f_2$, $f_2 \leq f_C \leq f_3$, . . . $f_{N-1} \leq f_n \leq f_N$ that are shown at input ports (not shown) of the multiplexer 17.

The output frequency multiplexer 17 recombines the channelized plurality of conditioned frequency components $f_A$, $f_B$, $f_C$ . . . $f_n$ from the array 15 into a composite conditioned signal of original bandwidth $\Delta f_s$ within the frequency span $f_0$ to $f_N$ of the receiver and at a safe power level with a minimum amount of interference.

The protection circuit 11 may further include an input array 21 of phase-adjusting sub-circuits $21_1$, $21_2$, $21_3$, . . . $21_N$ respectively disposed between the associated output ports of the input frequency demultiplexer 13 and the associated input ports of the array 15 of signal conditioning sub-circuits $15_1$, $15_2$, $15_3$, . . . $15_N$. The purpose of such an input array 21 is to respectively adjust the phases of the individual channelized plurality of contiguous frequency components $f_A$, $f_B$, $f_C$ . . . $f_n$ that are respectively contained within the plurality of contiguous channels in the array 15 so that at the crossover points between channels (or where one channel leads into the next channel) the conditioned contiguous frequency components do not combine out of phase and inadvertently cause disruptive attenuation spikes in the composite signal at the output of the multiplexer 17.

In a similar manner, the protection circuit 11 may also include an output array 23 of phase-adjusting sub-circuits $23_1$, $23_2$, $23_3$, . . . $23_N$ respectively disposed between the associated output ports of the array 15 of signal conditioning sub-circuits $15_1$, $15_2$, $15_3$, . . . $15_N$ and the associated input ports of the output frequency multiplexer 17. The purpose of the output array 23 is to respectively adjust the phases of the individual channelized plurality of the conditioned contiguous frequency components $f_A$, $f_B$, $f_C$ . . . $f_n$ that are respectively contained within the plurality of contiguous channels in the multiplexer 17 so that at the crossover points between channels (or where one channel leads into the next channel) the conditioned contiguous frequency components do not combine out of phase and inadvertently cause disruptive attenuation spikes in the composite signal at the output port 25 of the multiplexer 17.

The determinative characteristic sought for the demultiplexer 13 and the multiplexer 17 is for them to possess common-signal ports that are closely matched to the system transmission line impedance (for example, 50 ohms in FIG. 2—to be discussed) at all frequencies within the passband of the receiver. Each of the phase-adjusting sub-circuits in each of the arrays 21 and 23 could be implemented as a transmission line (FIG. 2) or phase shifter (not shown) to obtain a desired phase adjustment or phase shift. One way to determine if the phase adjustment is proper is to monitor on an oscilloscope (not shown) the signal at the output port 25 of the multiplexer 17 and adjust each phase-adjusting sub-circuit in the arrays 21 and 23 to maximize the signal at the output port 25.

The demultiplexer 13 may be a passive or an active circuit. Passive components can be reciprocal or nonreciprocal. They may include distributed elements (consisting of transmission line segments), lumped elements (such as capacitors and inductors), ferrite-based elements, as well as combinations thereof, and may utilize normal metals, superconductors, or combinations of the two. The circuit configuration of the demultiplexer 13 may be selected from a wide range of options which include, but are not limited to circuits of logarithmic-periodic and modified-logarithmic-periodic (or non-logarithmic-periodic) design. The demultiplexer 13 may, in particular, be a microwave frequency demultiplexer.

The dominant design issues, when it comes to translating the concept into a practical implementation, relate primarily to the input demultiplexer 13 and the output multiplexer 17. These circuits govern the frequency-selective properties of the limiting process and help define the amplitude and phase characteristics of transmitted signals. The number of demultiplexer and multiplexer channels needed for a given task will depend on the selectivity requirements of the particular application. This may often involve as few as three or four channels. The numbers may be larger if the application calls for maximum operational bandwidth to be maintained against a dense spectrum of random interference signals. In a situation like this, issues related to network architecture and circuit size demand special attention. Channelizer circuits of the manifold type constitute the most efficient arrangements with regard to space utilization and signal transmission properties. They have the reputation, though, of being difficult and costly to design. This stems from the absence of directional circuit components, such as directional couplers and circulators, which are commonly used with alternative channelizer approaches to help suppress interdependence among channel filters and facilitate design and implementation procedures. The reliance on logarithmic-periodicity-based design methods has provided a convenient and effective means to resolve the long-standing dilemma. The effectiveness of these methods is particularly evident in cases that involve large numbers of contiguous narrowband channels.

In one application, the array 15 of signal conditioning sub-circuits accepts the channelized output signals from the output ports of the demultiplexer 13 and subjects each of these signals to power-limiting within respective frequency subbands. After limiting, each signal is forwarded to a separate array output port. The limiting devices used for each signal will typically be of common design, involving either active-circuit or passive-circuit two-port configurations. Possibilities include limiting amplifiers, semiconductor diode-based limiters, ferrite limiters, gas-tube limiters, superconductor limiters, controlled attenuators or switches, and combinations thereof.

The function of the multiplexer 17 is to accept the channelized, limited signals from the output ports of the array 15 of signal conditioning sub-circuits and recombine them into a composite signal of original bandwidth. The multiplexing function is essentially complementary to the demultiplexing function, whence the comments associated with demultiplexer circuit may be transposed to describe multiplexer circuit options as well.

The invention has been explained in the general first embodiment shown in FIG. 1. A more specific second embodiment of the invention will be discussed by now referring to FIG. 2.

Figure 2:
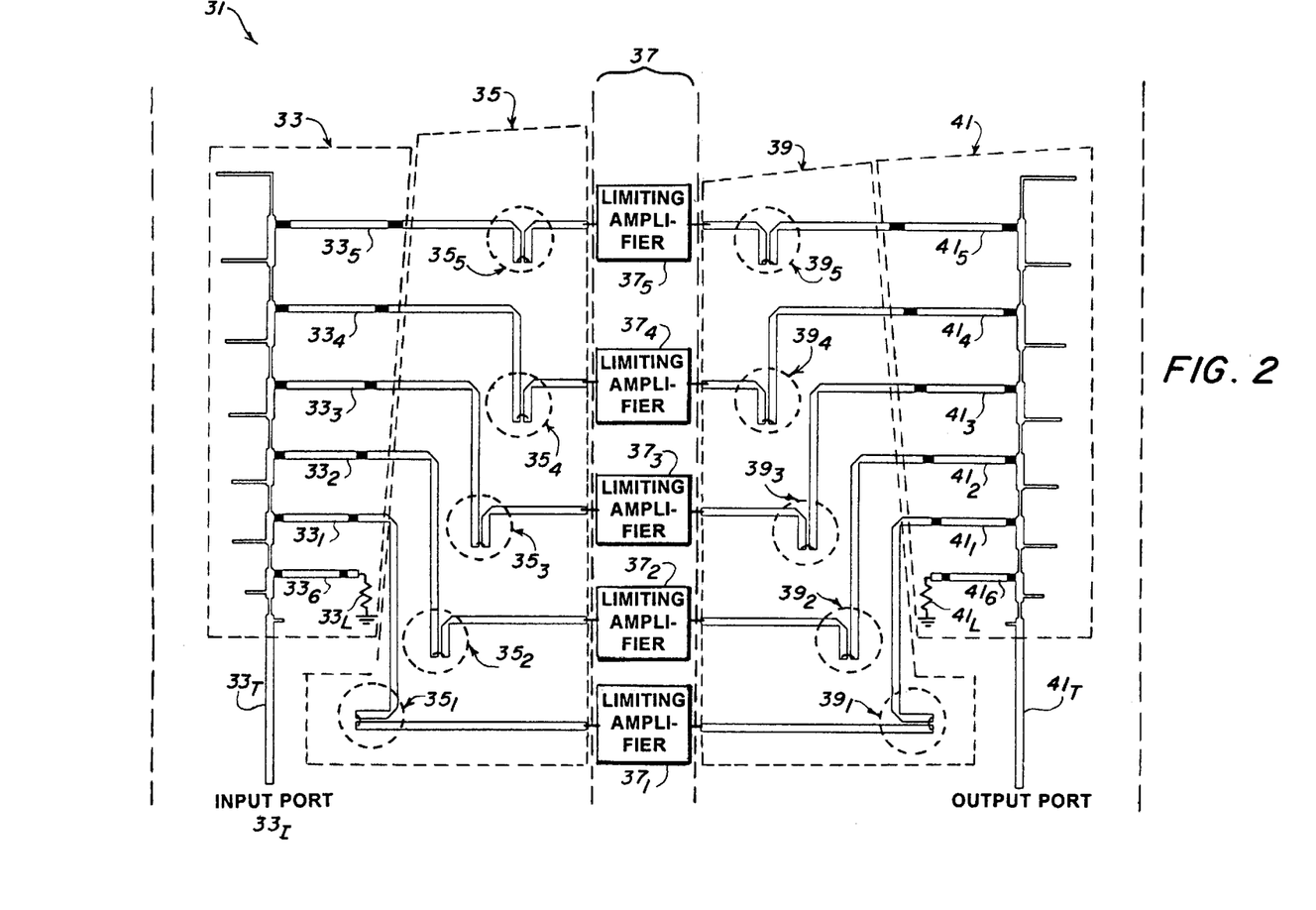
FIG. 2 is a schematic block diagram of an exemplary 7.5 GHz–12.5 GHz channelized limiting amplifier according to the invention.

FIG. 2 illustrates a schematic diagram of the experimental receiver channelized protection circuit 31 that was used to demonstrate the practicability of the invention. The protection circuit 31 of FIG. 2 is specifically in the form of a channelized self-limiting amplifier.

The protection circuit 31 basically comprises an input channelizer or demultiplexer 33 for separating an input wideband signal into contiguous subbands or channels for subsequent parallel processing; an input array of phase-adjusting transmission lines 35 for compensating for phase imbalances among the contiguous subbands; an array of self-limiting amplifier chips 37 to accomplish amplitude limiting on a frequency-selective, self-induced, instantaneous basis; an output array of phase-adjusting transmission lines 39 for compensating for phase imbalances among the amplitude-limited contiguous subbands; and an output channelizer or multiplexer 41 (that is complementary to the input demultiplexer 33) for reuniting the conditioned contiguous subbands to produce a signal composite of original bandwidth.

The protection circuit 31 is implemented to receive five contiguous channels of 1-GHz bandwidth (7.5 to 8.5 GHz, 8.5 to 9.5 GHz, 9.5 to 10.5 GHz, 10.5 to 11.5 GHz, and 11.5 to 12.5 GHz), covering an uninterrupted 7.5-to-12.5-GHz frequency span or band of the associated receiver (not shown) that is to be protected.

The input demultiplexer 33 is implemented in the form of a manifold structure comprised of a common lowpass trunk line $33_T$ which branches off into five bandpass channel filters $33_1$–$33_5$. The bandpass channel filters $33_1$–$33_5$ comprise capacitively-end-coupled, single-strip resonators. An additional bandpass filter $33_6$, which is terminated in a 50 ohm dummy load $33_L$, is incorporated into the trunk line $33_T$ of the manifold structure of the multiplexer 33 for purposes of impedance matching. Also included is the input array of phase-adjusting transmission lines 35, comprised of short coupled-line phase shifter sections $35_1$–$35_5$ that can be adjusted to compensate for phase imbalances among channels caused by design and fabrication tolerances.

Channelized-signal ports (not shown) of the bandpass channel filters $33_1$–$33_5$ of the demultiplexer 33 are coupled to associated ones of input ports (not shown) of the limiting amplifiers $37_1$–$37_5$ through associated ports (not shown) of the phase shifter sections $35_1$–$35_5$. The amplifiers $37_1$–$37_5$ can be exemplary general-purpose Texas Instruments EG8310 microwave monolithic integrated circuit chips (MMIC). These amplifiers $37_1$–$37_5$ provide amplitude limiting of input signals through reliance on the amplifiers' own gain saturation properties, thereby conveniently satisfying proof-of-concept objectives without a need for separate limiter devices.

Associated ones of output ports (not shown) of the limiting amplifiers $37_1$–$37_5$ are respectively coupled to associated ports (not shown) of short coupled-line phase shifter sections $39_1$–$39_5$ of the output array of phase-adjusting transmission lines 39. These phase shifter sections $39_1$–$39_5$, like the previously discussed phase shifter sections $35_1$–$35_5$, can be adjusted to compensate for phase imbalances among channels caused by design and fabrication tolerances.

The phase shifter sections $39_1$–$39_5$ are respectively coupled to bandpass channel filters $41_1$–$41_5$ of the output multiplexer 41. Similar to the input demultiplexer 33, the output multiplexer 41 is implemented in the form of a manifold structure comprised of a common lowpass trunk line $41_T$ which branches off into the five bandpass channel filters $41_1$–$41_5$ of the multiplexer 41. The bandpass channel filters $41_1$–$41_5$ comprise capacitively-end-coupled, single strip resonators. An additional bandpass filter $41_6$, which is terminated in a 50 ohm dummy load $41_L$, is incorporated into the trunk line $41_T$ of the manifold structure of the multiplexer 41 for purposes of impedance matching.

The output multiplexer 41 recombines the channelized plurality of amplitude-limited signal components from the five bandpass channel filters $41_1$–$41_5$, which are branched into the common lowpass trunk line $41_T$, into a composite amplitude-limited signal of the original 5 GHz bandwidth within the frequency span from 7.5 to 12.5 GHz of the receiver and at a safe power level with a minimum amount of interference.

Channelization is established through the input demultiplexer 33 and the complementary output multiplexer 41. The two manifold or channelizer structures (input demultiplexer and output multiplexer) 33 and 41 are based on logarithmic-periodic design principles, modified to accommodate channels of equal bandwidth (or modified-logarithmic-periodic design). However, it should be noted that adherence to strict logarithmic periodicity would have provided frequency channels of constant fractional bandwidth as opposed to channels of constant absolute bandwidth. The modified-logarithmic-periodic design (or non-logarithmic-periodic design)) of the input demultiplexer 33 and output multiplexer 41 of the protection circuit 31 may be of the type more fully described in U.S. Pat. No. 5,438,572, issued Aug. 1, 1995, and herein incorporated by reference. In addition, since the input demultiplexer 33 and output multiplexer 41 of the protection circuit 41 could also be implemented to form logarithmic-periodic structures, they could be of the type more fully described in U.S. Pat. No. 5,101,181, issued Mar. 31, 1992, and herein incorporated by reference.

Each of the channelizer structure 33 and 41 is realized in microstrip on a 0.015-inch-thick alumina substrate and contains the five bandpass channel filters ($33_1$–$33_5$ for the channelizer 33, and $41_1$–$41_5$ for the channelizer 41) which branch off from the associated common lowpass trunk lines discussed before.

Essentially corresponding channelized-signal ports of the demultiplexer 33 and multiplexer 41 structures are linked together through the limiting amplifiers $37_1$–$37_5$. As indicated before, the purpose of the amplifiers $37_1$–$37_5$ is to introduce amplitude limiting to the signal components from the phase shifter sections $35_1$–$35_5$ through reliance on the amplifiers' own gain saturation properties, thereby conveniently satisfying proof-of-concept objectives without a need for separate limiter devices.

It will be recalled that in the embodiment of FIG. 2, the protection circuit 31 is implemented to receive five contiguous channels of 1-GHz bandwidth (7.5 to 8.5 GHz, 8.5 to 9.5 GHz, 9.5 to 10.5 GHz, 10.5 to 11.5 GHz, and 11.5 to 12.5 GHz), covering an uninterrupted 7.5-to-12.5-GHz frequency span or band of the associated receiver (not shown) that is to be protected.

Thus, in the operation of the embodiment of FIG. 2, assume that a broadband signal covering the 7.5–12.5 GHz band of the associated receiver is received at an input port $33_1$ of the protection circuit 33 and that interference signals are contained within the 7.5–12.5 GHz frequency band of the received broadband signal. The manifold or bandpass channel filters $33_1$–$33_5$ of the demultiplexer 33 separate this broadband signal into five contiguous frequency channels or subbands $C_1$–$C_5$ of 1-GHz bandwidth having respective passbands of 7.5 to 8.5 GHz, 8.5 to 9.5 GHz, 9.5 to 10.5 GHz, 10.5 to 11.5 GHz, and 11.5 to 12.5 GHz. Thus, any interference signal components contained within the bandwidth of the input broadband signal are separated by frequency into narrow frequency bands.

The phase shifter sections $35_1$–$31_5$ compensate for phase imbalances among the channels $C_1$–$C_5$. After phase compensation, the signal components in the different frequency channels $C_1$–$C_5$ are separately subjected to amplitude limiting and optional amplification by associated respective ones of the channelized self-limiting amplifiers $37_1$–$37_5$. If an interference is present in a frequency channel, the associated limiting amplifier can either reduce its gain or effectively take itself out of operation by saturating, without affecting any of the other limiting amplifiers and signal channels.

Output frequency components from the limiting amplifiers $37_1$–$37_5$ are phase-compensated by phase shifter sections $39_1$–$39_5$ to compensate for phase imbalances among the channels $C_1$–$C_5$. The phase-compensated outputs from the phase shifter sections $39_1$–$39_5$ are then combined by the output multiplexer 41 to form a receiver-compatible signal composite of original bandwidth and at a safe power level with a minimum amount of interference.

Figure 3:
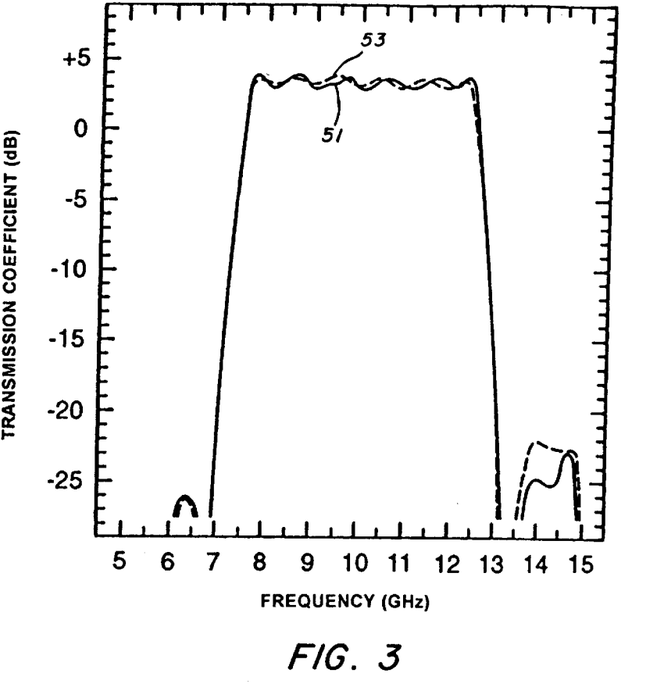
FIG. 3 illustrates the small-signal transfer characteristics of the experimental circuit of FIG. 3.

It should be noted that, for the receiver protection circuit 31 of FIG. 2 to be useful, it must be capable, in the absence of large-signal interference, of passing low-level incident signals with minimal amplitude disturbance. The described experimental receiver channelized protection circuit 31 of FIG. 2 meets this criterion, as evidenced by the measured small-signal magnitude transfer characteristics plotted in FIG. 3 and indicated by the solid line 51. The response maintains an average gain of 3.5 dB across the band of interest, with a maximum ripple of ±0.5 dB. Also shown in FIG. 3, for comparison, are the corresponding calculated results indicated by the dashed line 53. Associated 5 with the magnitude characteristics, but not shown, are phase transfer characteristics that vary with frequency in a smooth, monotonic fashion. Noise figure values were found to be predictable as well, varying between 5.8 dB and 6.9 dB over the band, with the higher values recorded toward the passband edges. These results are consistent with listed amplifier noise figures of 4 dB and channel insertion loss contributions of 1–1.5 dB from each channelizer network.

Figure 4:
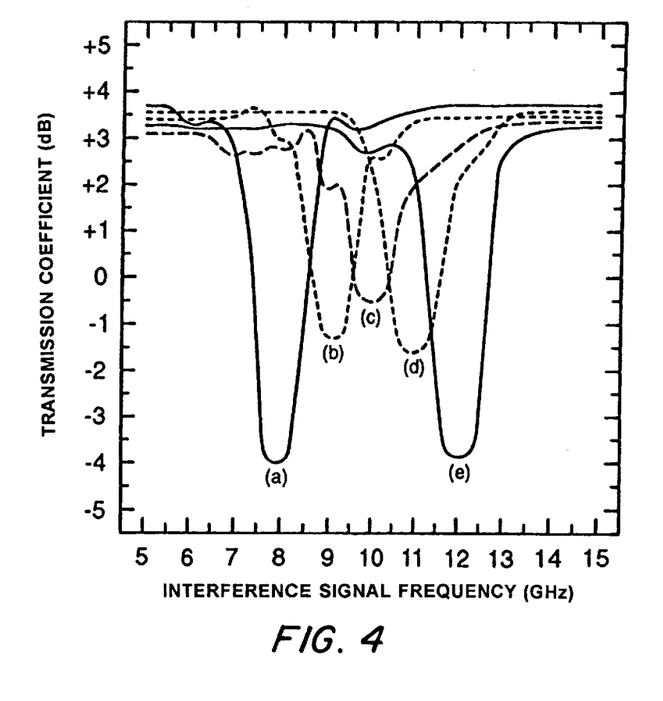
FIG. 4 illustrates small-signal transfer characteristics measured at channel center frequencies of (a) 8 GHz, (b) 9 GHz, (c) 10 GHz, (d) 11 GHz, and (e) 12 GHz as functions of interference signal frequency, with stepped-frequency test signal power and swept-frequency interference signal power held constant at 0 dBm and +13 dBm, respectively.

To equalize the passband response at the band edges, a slight boost in amplification was indicated for the lowest-frequency and the highest-frequency channels, compensating for their disadvantaged band-edge positions. The adjustments were conveniently achieved with the help of the amplifiers' built-in gain-control feature. Despite differences of less than 1 dB in amplifier gain among the five channels, the spread was apparently enough to entail variances in channel nonlinear behavior. This is illustrated in FIG. 4 where the measured output signals have been plotted as functions of input drive level for the five channel center frequencies. More specifically, FIG. 4 shows the power saturation characteristics measured at channel band centers of (a) 8 GHz, (b) 9 GHz, (c) 10 GHz, (d) 11 GHz, and (e) 12 GHz. The divergence of response curves at elevated drive levels points to trade-offs made between amplifier gain and saturated output power in an overriding effort to achieve passband flatness. With gain saturation employed as the principal amplitude limiting mechanism, the observed variations inadvertently led to differences in limiter performance among individual channels. The experimental circuit's ability to conclusively demonstrate the effectiveness of the concept was not compromised, however, since critical aspects related to frequency selectivity remained largely unaffected.

The benefits of frequency channelization are particularly evident in situations where wideband reception may be jeopardized by sporadic, narrowband interference signals.

To demonstrate this, the transfer characteristics of the experimental circuit were measured for various input excitations. Plotted in FIG. 4 are the responses of the protection circuit 31 to 0-dBm test signals applied at respective channel center frequencies in the presence of a swept-frequency +13-dBm CW interference signal, yielding five different small-signal test responses, one for each of the five channels. The curves illustrate how, with the help of the channelization scheme, large-signal-induced gain compression could be restricted to essentially one frequency band at a time. More specifically, FIG. 4 shows small-signal transfer characteristics measured at channel center frequencies of (a) 8 GHz, (b) 9 GHz, (c) 10 GHz, (d) 11 GHZ, and (e) 12 GHz as functions of interference signal frequency, with stepped-frequency test signal power and swept-frequency interference signal power held constant at 0 dBm and +13 dBm, respectively. Channel selectivities were largely determined by the filtering properties of the demultiplexer 33 and multiplexer 41 networks, with residual out-of-band compression attributed to parasitic channel interactions. The interference signal amplitude was chosen to be large enough so as to generate levels of compression that would permit validation of the concept under realistically severe operating conditions. Observed variations in peak compression level among channels are due to afore-mentioned differences in amplifier gain-control settings.

Figure 5:
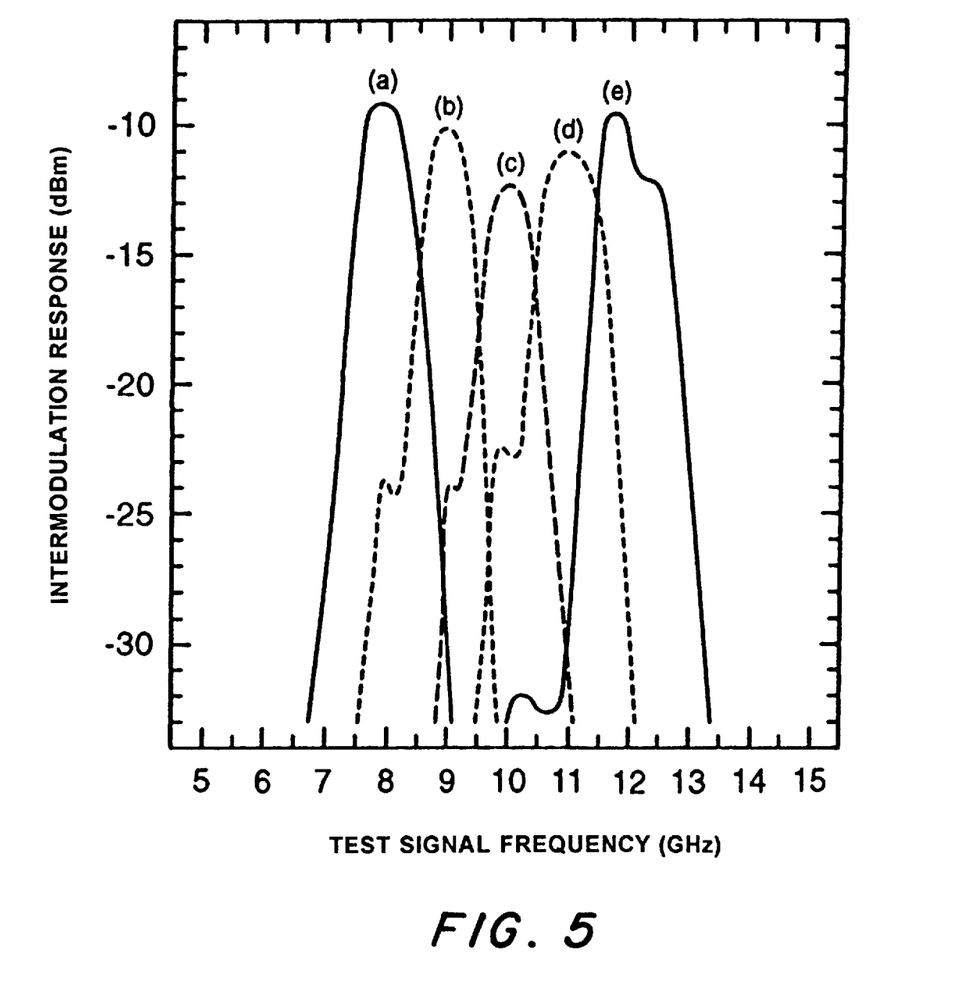
FIG. 5 illustrates third-order intermodulation responses measured as functions of test signal frequency for interference signals positioned at channel center frequencies of (a) 8 GHz, (b) 9 GHz, (c) 10 GHz, (d) 11 GHz, and (e) 12 GHz, with swept-frequency test signal power and swept-frequency interference signal power set at 0 bBm and +13 dBm, respectively.

In addition to compressed amplitude characteristics, the nonlinear limiting process will produce signal harmonics and intermodulation products that can impair reception. Channelization conveniently suppresses false signal contributions with frequency content outside the channel band containing the primary disturbance. To visualize this feature, the protection circuit 31 was subjected to a composite incident signal that consisted of a 0-dBm swept-frequency component and a +13-dBm CW interference signal which was stepped in frequency from one channel band center to the next. FIG. 5 shows third-order intermodulation products measured as functions of test signal frequency for interference signals positioned at channel center frequencies of (a) 8 GHz, (b) 9 GHz, (c) 10 GHz, (d) 11 GHz, and (e) 12 GHz, with swept-frequency test signal power and stepped-frequency interference signal power set at 0 dBm and +13 dBm, respectively. The curves in FIG. 5 represent envelope responses that follow, for each of the five stepped values of interference frequency, the larger of two third-order distortion product magnitudes. The results demonstrate how distortion can be effectively confined in frequency without overly stringent demands on channel filter selectivities.

The objective of the current investigation was to find a receiver protection system 31 that would both offer autonomous open-loop operation and provide a capability for frequency-based signal discrimination, thereby combining the benefits of amplitude-confinement approaches with those of frequency-selective techniques. The adopted solution relies on channelized parallel processing of incident-signal spectral components. The scheme, which is easy to implement, can accommodate a variety of processing tasks, such as amplitude limiting, phase shifting, switching, and amplification. The primary focus, in the present context, has been on limiter-amplifier functions, involving the use of efficient logarithmic-periodicity-based manifold structures to provide required frequency channelization.

ADVANTAGES AND NEW FEATURES OF THE INVENTION

The advantage of the invention over the prior art lies with the option to use simple autonomous amplitude limiting mechanism that do not necessitate external control, yet still confine the effects of interference to only those subbands that contain fundamental frequencies of interference signals. The confinement can be made arbitrarily narrow through the selection of a sufficient number of subbands. The crux is that, through channelization, harmonics and intermodulation signals generated in one channel remain separated so as not to affect other subbands, unlike in the case of a conventional power limiter.

ALTERNATIVES

Alternative ways to implement the invention have been discussed above. The areas of application extend, thereby, to most any receiver system where front-end protection is indicated. This includes both military and commercial applications. Aside from serving as an autonomous, frequency-selective, amplitude-limiting device, the invention can also be configured as a frequency-selective switch through the use of switches or switchable attenuators as control components. In this mode, the invention performs similar to a switchable multi-notch band-reject filter with individually controllable signal rejection notches at discrete predetermined notch frequencies. Furthermore, the use of control components that remain impedance-matched in their off positions provides the option to achieve signal suppression through signal absorption rather that through less-preferable signal reflection used in the prior art.

Therefore, what has been described is a receiver protection circuit for protecting the front-end of a receiver from the detrimental effects of interference signals within the bandwidth of the receiver. The receiver protection circuit basically comprises an input frequency demultiplexer that separates a composite input signal within a preselected bandwidth into contiguous frequency sub-bands, an array of signal conditioning sub-circuits that selectively affect the frequency sub-bands to produce a plurality of conditioned signal components, each of which is not detrimently affected by disturbances from signal components from other contiguous frequency channels, and an output frequency multiplexer that recombines the conditioned signals in the frequency sub-bands into a composite signal of the original preselected bandwidth and at a safe power level with a minimum amount of interference.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A receiver front-end channelized receiver protection circuit for protecting a wideband receiver from detrimental effects of interference signals within the bandwidth of received signals, said receiver channelized protection circuit comprising:

a frequency demultiplexer for separating a broadband input signal into a plurality of different signal components in respective contiguous frequency channels;

a plurality of signal conditioning sub-circuits respectively responsive to said plurality of different signal components for selectively performing a conditioning operation on said plurality of different signal components to produce a plurality of conditioned signal components each of which is not detrimently affected by disturbances from signal components from other contiguous frequency channels; and a frequency multiplexer having a plurality of contiguous frequency channels for recombining said plurality of conditioned signal components into a composite signal of original bandwidth and at a safe power level.

2. The receiver channelized protection circuit of claim 1 wherein:

said plurality of signal conditioning sub-circuits is selected from the group consisting of a plurality of limiters, a plurality of amplifiers, a plurality of limiting amplifiers, a plurality of switches and combinations thereof for affecting each channel separately.

3. A receiver front-end channelized receiver protection circuit for protecting a wideband receiver from detrimental effects of interference signals within the bandwidth of received signals, said receiver channelized protection circuit comprising:

a frequency demultiplexer for separating a broadband input signal into a plurality of different signal components in respective contiguous frequency channels;

a plurality of signal conditioning sub-circuits respectively responsive to said plurality of different signal components for selectively performing a conditioning operation on said plurality of different signal components to produce a plurality of conditioned signal components, each of which is not detrimentally affected by disturbances from signal components from other contiguous frequency channels;

a frequency multiplexer having a plurality of contiguous frequency channels for recombining said plurality of conditioned signal components into a composite signal of original bandwidth and at a safe power level;

a plurality of first phase-adjusting means respectively responsive to a plurality of different signal components from said frequency demultiplexer for compensating for phase imbalances among said plurality of different signal components before respectively applying said plurality of different signal components to said plurality of signal conditioning sub-circuits; and a plurality of second phase-adjusting means respectively responsive to said plurality of conditioned signal components from said plurality of signal conditioning sub-circuits for compensating for phase imbalances among said plurality of conditioned signal components before respectively applying said plurality of conditioned signal components to said frequency multiplexer.

4. The receiver channelized protection circuit of claim 1 wherein:

each of said frequency demultiplexer and said frequency multiplexer forms a logarithmic-periodic structure.

5. The receiver channelized protection circuit of claim 1 wherein:

each of said frequency demultiplexer and said frequency multiplexer forms a modified-logarithmic-periodic structure.

6. The receiver channelized protection circuit of claim 1 wherein:

said receiver protection circuit contains reciprocal components.

7. The receiver channelized protection circuit of claim 1 wherein:

said receiver protection circuit is implemented with non-reciprocal components.

8. The receiver channelized protection circuit of claim 1 wherein:

said frequency demultiplexer and said frequency multiplexer are each implemented as a manifold structure with contiguous frequency bands.

9. A microwave protection circuit for protecting the front-end of a receiver from detrimental effects of interference signals within the bandwidth of received signals, said microwave protection circuit comprising:

means responsive to a broadband input signal for separating said broadband signal into a plurality of different microwave signals in contiguous frequency channels, each microwave signal having a predetermined bandwidth and associated center frequency;

a plurality of signal conditioning sub-circuits respectively responsive to said plurality of different microwave signals for selectively affecting said plurality of different microwave signals to produce a plurality of contiguous conditioned microwave signals each of which is not affected by disturbances from the plurality of different microwave signals from within any of said contiguous frequency channels; and means coupled to said plurality of signal conditioning sub-circuits for recombining said plurality of contiguous conditioned microwave signals into a composite conditioned microwave signal of the original predetermined bandwidth and at a safe power level with a minimum amount of interference.

10. The microwave protection circuit of claim 9 wherein:

said separating means includes a frequency demultiplexer; and said recombining means includes a frequency multiplexer.

11. A microwave protection circuit for protecting the front-end of a receiver from detrimental effects of interference signals within the bandwidth of received signals, said microwave protection circuit comprising:

means responsive to a broadband input signal for separating said broadband signal into a plurality of different microwave signals in contiguous frequency channels, each microwave signal having a predetermined bandwidth and associated center frequency, said separating means including:

a frequency demultiplexer for separating said broadband signal into said plurality of different microwave signals in contiguous frequency channels, and a plurality of first phase-adjusting means respectively responsive to said plurality of different microwave signals from said frequency demultiplexer for compensating for phase imbalances among said plurality of different microwave signals before respectively applying said plurality of different microwave signals to a plurality of signal conditioning sub-circuits; and said plurality of signal conditioning sub-circuits respectively responsive to said plurality of different microwave signals for selectively affecting said plurality of different microwave signals to produce a plurality of contiguous conditioned microwave signals, each of which is not affected by disturbances from said plurality of different microwave signals within any of said contiguous frequency channels; and means coupled to said plurality of signal conditioning sub-circuits for recombining said plurality of contiguous conditioned microwave signals into a composite conditioned microwave signal of the original predetermined bandwidth and at a safe power level with a minimum amount of interference, said recombining means including:

a plurality of second phase-adjusting means respectively responsive to said plurality of contiguous conditioned microwave signals from said plurality of signal conditioning sub-circuits for compensating for phase imbalances among said plurality of conditioned microwave signals, and a frequency multiplexer having a plurality of contiguous frequency channels for recombining said plurality of contiguous conditioned microwave signals into said composite conditioned microwave signal.

12. The microwave protection circuit of claim 10 wherein:

said plurality of signal conditioning sub-circuits is selected from the group consisting of a plurality of limiters, a plurality of amplifiers, a plurality of limiting amplifiers, a plurality of switches and combinations thereof for affecting each channel separately.

13. A microwave protection circuit for protecting the front-end of a receiver from detrimental effects of interference signals within the bandwidth of received signals, said microwave protection circuit comprising:

means responsive to a broadband input signal for separating said broadband signal into a plurality of different microwave signals in contiguous frequency channels, each microwave signal having a predetermined bandwidth and associated center frequency;

a plurality of signal conditioning sub-circuits respectively responsive to said plurality of different microwave signals for selectively affecting said plurality of different microwave signals to produce a plurality of contiguous conditioned microwave signals, each of which is not affected by disturbances from the plurality of different microwave signals from within any of said contiguous frequency channels;

means coupled to said plurality of signal conditioning sub-circuits for recombining said plurality of contiguous conditioned microwave signals into a composite conditioned microwave signal of the original predetermined bandwidth and at a safe power level with a minimum amount of interference, said recombining means including a frequency multiplexer;

a plurality of first phase-adjusting means respectively responsive to said plurality of different microwave signals from said frequency demultiplexer for compensating for phase imbalances among said plurality of different microwave signals before respectively applying said plurality of different microwave signals to said plurality of signal conditioning sub-circuits; and a plurality of second phase-adjusting means respectively responsive to said plurality of contiguous conditioned microwave signals from said plurality of signal conditioning sub-circuits for compensating for phase imbalances among said plurality of conditioned microwave signals before respectively applying said plurality of conditioned microwave signals to said frequency multiplexer.

14. The microwave protection circuit of claim 10 wherein:

each of said frequency demultiplexer and said frequency multiplexer forms a logarithmic-periodic structure.

15. The microwave protection circuit of claim 10 wherein:

each of said frequency demultiplexer and said frequency multiplexer forms a modified-logarithmic-periodic structure.

16. The microwave protection circuit of claim 10 wherein:

said receiver protection circuit is implemented with reciprocal components.

17. The microwave protection circuit of claim 10 wherein:

said receiver protection circuit contains nonreciprocal components.

18. The microwave protection circuit of claim 10 wherein:

said frequency demultiplexer and said frequency multiplexer are each implemented as a manifold structure with contiguous frequency bands.

19. A protection circuit for protecting the front-end of a broadband receiver from detrimental effects of interference signals within the bandwidth of received signals, said protection circuit comprising:

an input port;

a frequency demultiplexer comprised of an input trunk line coupled at one end to said input port, a first plurality of bandpass channel filters sequentially branching off from said input trunk line, each bandpass channel filter being responsive to a different predetermined microwave signal, said channel filters of said frequency demultiplexer being responsive to a broadband input signal applied to said input port for separating said broadband input signal into a plurality of different microwave signals in respective contiguous frequency channels, each microwave signal having a predetermined bandwidth and associated center frequency;

a plurality of signal conditioning sub-circuits respectively responsive to said plurality of different microwave signals in respective contiguous frequency channels for selectively affecting said plurality of different microwave signals to produce a plurality of contiguous conditioned microwave signals minimally affected by interference signals from within any of said contiguous frequency channels; and a frequency multiplexer comprised of an output port, an output trunk line coupled at one end to said output port, a second plurality of bandpass channel filters respectively coupled to said plurality of signal conditioning sub-circuits for recombining said conditioned microwave signals into a composite conditioned microwave signal of the original bandwidth of the broadband input signal and at a safe power level with a minimum amount of disturbance from interference signals at said output port.

20. A protection circuit for protecting the front-end of a broadband receiver from detrimental effects of interference signals within the bandwidth of received signals, said protection circuit comprising:

an input port;

a frequency demultiplexer comprised of an input trunk line coupled at one end to said input port, a first plurality of channel filters sequentially branching off from said input trunk line, each channel filter being responsive to a different predetermined microwave signal, said channel filters of said frequency demultiplexer being responsive to a broadband input signal applied to said input port for separating said broadband input signal into a plurality of different microwave signals in respective contiguous frequency channels, each microwave signal having a predetermined bandwidth and associated center frequency;

a plurality of signal conditioning sub-circuits respectively responsive to said plurality of different microwave signals in respective contiguous frequency channels for selectively affecting said plurality of different microwave signals to produce a plurality of contiguous conditioned microwave signals, each of which is not affected by disturbances from said plurality of different microwave signals from within any of said contiguous frequency channels;

a frequency multiplexer comprised of an output port, an output trunk line coupled at one end to said output port, a second plurality of channel filters respectively coupled to said plurality of signal conditioning sub-circuits for recombining said conditioned microwave signals into a composite conditioned microwave signal of the original bandwidth of the broadband input signal and at a safe power level with a minimum amount of disturbance from interference signals at said output port;

a plurality of first phase-adjusting means respectively responsive to said plurality of different microwave signals from said frequency demultiplexer for compensating for phase imbalances among said plurality of different microwave signals before respectively applying said plurality of different microwave signals to said plurality of signal conditioning sub-circuits; and a plurality of second phase-adjusting means respectively responsive to said plurality of contiguous conditioned microwave signals from said plurality of signal conditioning sub-circuits for compensating for phase imbalances among said plurality of conditioned microwave signals before respectively applying said plurality of conditioned microwave signals to said frequency multiplexer.

21. A receiver front-end channelized receiver protection circuit for protecting a wideband receiver from detrimental effects of interference signals within the bandwidth of received signals, said receiver channelized protection circuit comprising:

a frequency demultiplexer for separating a broadband input signal into a plurality of different signal components in respective contiguous frequency channels;

a plurality of signal conditioning sub-circuits respectively responsive to said plurality of different signal components for selectively performing a conditioning operation on said plurality of different signal components to produce a plurality of conditioned signal components, each of which is not affected by disturbances from signal components from other contiguous frequency channels;

a frequency multiplexer having a plurality of contiguous frequency channels for recombining said plurality of conditioned signal components into a composite signal of original bandwidth and at a safe power level; and a plurality of phase-adjusting means disposed between said frequency demultiplexer and said frequency multiplexer and coupled to said plurality of signal conditioning sub-circuits respectively responsive to said plurality of different signal components for compensating for phase imbalances among said plurality of different signal components.

22. A microwave protection circuit for protecting the front-end of a receiver from detrimental effects of interference signals within the bandwidth of received signals, said microwave protection circuit comprising:

means responsive to a broadband input signal for separating said broadband signal into a plurality of different microwave signals in contiguous frequency channels, each microwave signal having a predetermined bandwidth and associated center frequency, said separating means including:

a frequency demultiplexer for separating said broadband signal into said plurality of different microwave signals in contiguous frequency channels, and a plurality of phase-adjusting means respectively responsive to said plurality of different microwave signals from said frequency demultiplexer for compensating for phase imbalances among said plurality of different microwave signals before respectively applying said plurality of different microwave signals to a plurality of signal conditioning sub-circuits;

said plurality of signal conditioning sub-circuits respectively responsive to said plurality of different microwave signals for selectively affecting said plurality of different microwave signals to produce a plurality of contiguous conditioned microwave signals, each of which is not affected by disturbances from said plurality of different microwave signals from within any of said contiguous frequency channels; and means coupled to said plurality of signal conditioning sub-circuits for recombining said plurality of contiguous conditioned microwave signals into a composite conditioned microwave signal of the original predetermined bandwidth and at a safe power level with a minimum amount of interference, said recombining means including a frequency multiplexer having a plurality of contiguous frequency channels for recombining said plurality of contiguous conditioned microwave signals into said composite conditioned microwave signal.

23. A microwave protection circuit for protecting the front-end of a receiver from detrimental effects of interference signals within the bandwidth of received signals, said microwave protection circuit comprising:

means responsive to a broadband input signal for separating said broadband signal into a plurality of different microwave signals in contiguous frequency channels, each microwave signal having a predetermined bandwidth and associated center frequency, said separating means including a frequency demultiplexer;

a plurality of signal conditioning sub-circuits respectively responsive to said plurality of different microwave signals for selectively affecting said plurality of different microwave signals to produce a plurality of contiguous conditioned microwave signals, each of which is not affected by disturbances from the plurality of different microwave signals from within any of said contiguous frequency channels;

means coupled to said plurality of signal conditioning sub-circuits for recombining said plurality of contiguous conditioned microwave signals into a composite conditioned microwave signal of the original predetermined bandwidth and at a safe power level with a minimum amount of interference, said recombining means including a frequency multiplexer; and a plurality of phase-adjusting means respectively responsive to said plurality of different microwave signals from said frequency demultiplexer for compensating for phase imbalances among said plurality of different microwave signals before respectively applying said plurality of different microwave signals to said plurality of signal conditioning sub-circuits.

24. A protection circuit for protecting the front-end of a broadband receiver from detrimental effects of interference signals within the bandwidth of received signals, said protection circuit comprising:

an input port;

a frequency demultiplexer comprised of an input trunk line coupled at one end to said input port, a first plurality of channel filters sequentially branching off from said input trunk line, each channel filter being responsive to a different predetermined microwave signal, said channel filters of said frequency demultiplexer being responsive to a broadband input signal applied to said input port for separating said broadband input signal into a plurality of different microwave signals in respective contiguous frequency channels, each microwave signal having a predetermined bandwidth and associated center frequency;

a plurality of signal conditioning sub-circuits respectively responsive to said plurality of different microwave signals in respective contiguous frequency channels for selectively affecting said plurality of different microwave signals to produce a plurality of contiguous conditioned microwave signals, each of which is not affected by disturbances from said plurality of different microwave signals from within any of said contiguous frequency channels;

a frequency multiplexer comprised of an output port, an output trunk line coupled at one end to said output port, a second plurality of channel filters respectively coupled to said plurality of signal conditioning sub-circuits for recombining said conditioned microwave signals into a composite conditioned microwave signal of the original bandwidth of the broadband input signal and at a safe power level with a minimum amount of disturbance from interference signals at said output port; and a plurality of phase-adjusting means respectively responsive to said plurality of different microwave signals from said plurality of signal conditioning sub-circuits for compensating for phase imbalances among said plurality of different microwave signals before respectively applying said plurality of different microwave signals to said frequency multiplexer.

\* \* \* \* \*